(12) United States Patent
Silverstein et al.

(10) Patent No.: US 7,643,088 B2
(45) Date of Patent: Jan. 5, 2010

(54) ARTIFACT REDUCTION IN A DIGITAL VIDEO

(75) Inventors: D. Amnon Silverstein, Mountain View, CA (US); Jian Fan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 885 days.

(21) Appl. No.: 11/000,766

(22) Filed: Dec. 1, 2004

(65) Prior Publication Data

US 2006/0114358 A1 Jun. 1, 2006

(51) Int. Cl.
*H04N 11/20* (2006.01)
*H04N 5/91* (2006.01)

(52) U.S. Cl. ............... 348/441; 348/606; 348/607; 386/46

(58) Field of Classification Search ............ 386/46; 348/606, 607, 624–630, 441, 443, 448, 452, 348/459; 382/260–266
See application file for complete search history.

(56) References Cited

U.S. PATENT DOCUMENTS

| | | | |
|---|---|---|---|
| 5,063,603 A | 11/1991 | Burt | |
| 5,387,947 A * | 2/1995 | Shin | 348/699 |
| 5,428,397 A * | 6/1995 | Lee et al. | 348/448 |
| 5,436,979 A | 7/1995 | Gray et al. | |
| 5,446,501 A | 8/1995 | Takemoto et al. | |
| 5,457,481 A * | 10/1995 | Sohn et al. | 345/547 |
| 6,035,072 A | 3/2000 | Read | |
| 6,125,213 A | 9/2000 | Morimoto | |
| 6,233,364 B1 | 5/2001 | Krainiouk et al. | |
| 6,266,054 B1 | 7/2001 | Lawton et al. | |
| 6,578,017 B1 | 6/2003 | Ebersole et al. | |
| 6,583,823 B1 | 6/2003 | Shimada et al. | |
| 6,792,161 B1 | 9/2004 | Imaizumi et al. | |
| 6,794,608 B2 | 9/2004 | Flood et al. | |
| 7,369,181 B2 * | 5/2008 | Kang et al. | 348/606 |
| 2002/0071613 A1 | 6/2002 | Ford et al. | |

FOREIGN PATENT DOCUMENTS

| | | |
|---|---|---|
| EP | 0666695 | 8/1995 |
| GB | 2356514 | 5/2001 |

\* cited by examiner

*Primary Examiner*—Thai Tran
*Assistant Examiner*—Mishawn Dunn

(57) ABSTRACT

A method performed by a processing system is provided. The method comprises detecting a first pixel value associated with an artifact in a current frame of a digital video using a previous frame and a next frame and replacing the first pixel value in the first frame with a replacement value.

35 Claims, 5 Drawing Sheets

ARTIFACT REDUCTION IN A DIGITAL VIDEO

BACKGROUND

Movies, videos, and other images may be captured from one or more scenes using a video medium such as film and a video capture device such as a camera. After processing, the video medium may be used to reproduce the images by displaying the images using a display device such as a projector. Occasionally, artifacts caused by dust and scratches, for example, may appear on the video medium. The artifacts may affect the display of the images of the video medium in undesired ways.

For example, a video medium such as TechniColor film captured with a TechniColor camera may have artifacts in the form of dust or scratches on the surface of one or more of the color planes of the film. With the TechniColor camera, the images are captured using a separate filmstrip for the red, green, and blue colors to generate red, green, and blue planes for each image. As a result, dust or scratches on any one of the red, green or blue filmstrips may be displayed when an image is projected onto a screen or other display device.

Artifacts on a video medium may also appear in a digitized version of the video medium. In converting a video medium to a digital form, artifacts may also be converted and become part of a digital video. Consequently, the artifacts may appear when the digital video is viewed or displayed. It would be desirable to be able to improve the display of a digital video with artifacts.

SUMMARY

One form of the present invention provides a method performed by a processing system. The method comprises detecting a first pixel value associated with an artifact in a current frame of a digital video using a previous frame and a next frame and replacing the first pixel value in the first frame with a replacement value.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

As described herein, a system, method, and program product for generating an enhanced digital video is provided. For each frame in the digital video, the system, method, and program product contemplate detecting and removing artifacts caused by dust and scratches, for example, to generate an enhanced digital video. An artifact in a frame is detected by comparing pixel values in the frame with pixel values from a previous and/or next frame and with other information. Once detected, the artifact is replaced with either pixel values interpolated from the previous and next frame or a region from a previous or next frame. As a result, visual appearance of a digital video may be enhanced.

Figure 1:
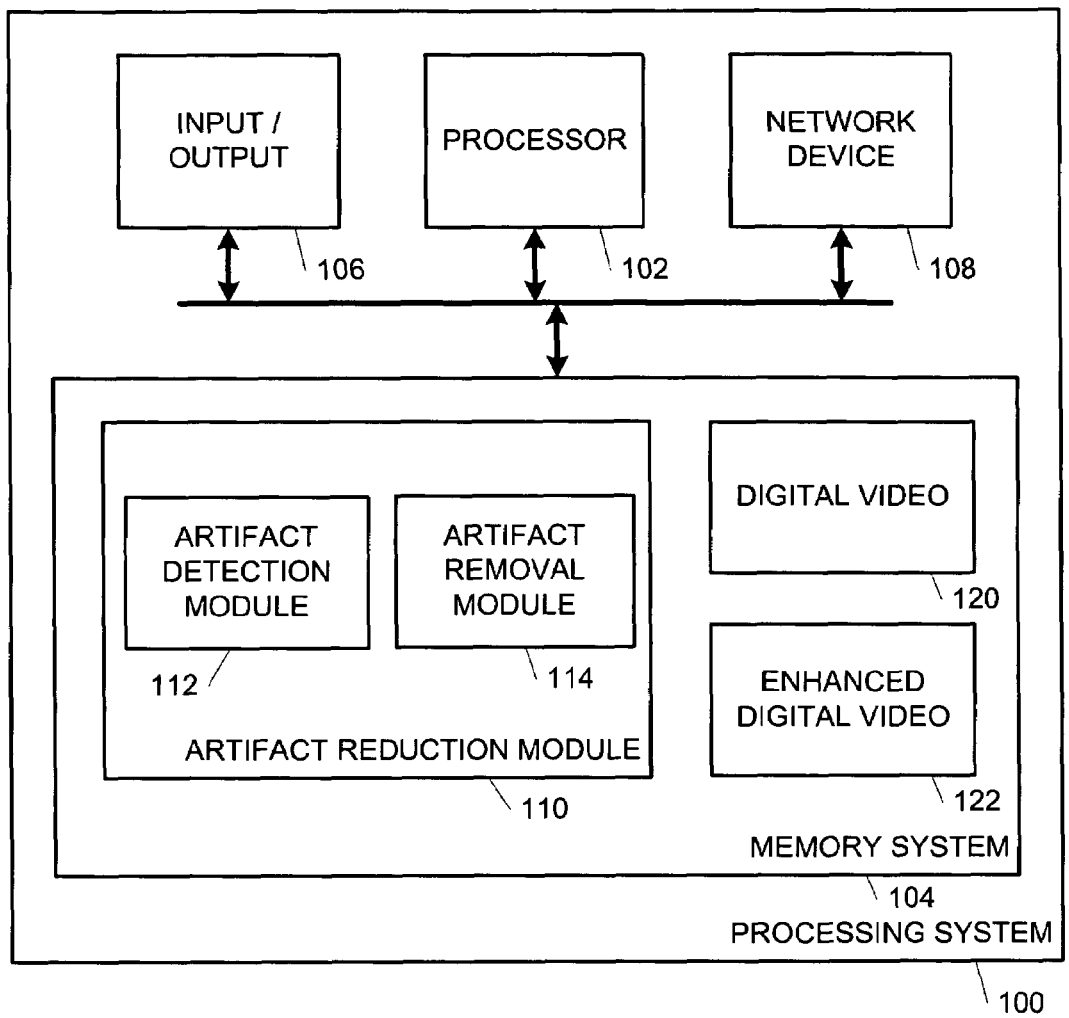
FIG. 1 is a block diagram illustrating a processing system configured to remove artifacts from a digital video according to one embodiment of the present invention.

FIG. 1 is a block diagram illustrating a processing system 100 configured to remove artifacts from a digital video 120. Processing system 100 comprises a processor 102, a memory system 104, an input/output unit 106, and a network device 108. Memory system 104 is for storing an artifact reduction module 110, an artifact detection module 112, an artifact removal module 114, digital video 120, and an enhanced digital video 122.

Processing system 100 is configured to generate enhanced digital video 122 from digital video 120 using artifact reduction module 110, artifact detection module 112, and artifact removal module 114. Processing system 100 comprises any type of computer system or portable or non-portable electronic device. Example computer systems include desktop, laptop, notebook, workstation, or server computer systems, and examples of electronic devices include digital cameras, digital video cameras, printers, scanners, mobile telephones, and personal digital assistants.

In one embodiment, artifact reduction module 110, artifact detection module 112, and artifact removal module 114 each comprise instructions stored in memory system 104 that are accessible and executable by processor 102. Memory system 104 comprises any number and types of volatile and non-volatile storage devices such as RAM, hard disk drives, CD-ROM drives, and DVD drives. In other embodiments, artifact reduction module 110, artifact detection module 112, and artifact removal module 114 may comprise any combination of hardware and software components configured to perform the functions described herein.

A user of processing system 100 can manage and control the operation of artifact reduction module 110, artifact detection module 112, and artifact removal module 114 by providing inputs and receiving outputs using input/output unit 106. Input/output unit 106 may comprise any combination of a keyboard, a mouse, a display device, or other input/output device that is coupled, directly or indirectly, to processing system 100.

Artifact reduction module 110, artifact detection module 112, artifact removal module 114, and digital video 120 may each be stored on a medium separate from processing system 100 (not shown) prior to being stored in processing system 100. Examples of such a medium include a hard disk drive, a compact disc (e.g., a CD-ROM, CD-R, or CD-RW), and a digital video disc (e.g., a DVD, DVD-R, or DVD-RW). Processing system 100 may access artifact reduction module 110, artifact detection module 112, artifact removal module 114, and digital video 120 from a remote processing or storage system (not shown) that comprises the medium using network device 108. Network device 108 may be coupled, directly or indirectly, to any type of wired or wireless local area, wide area, or global communications network.

Digital video 120 comprises a plurality of digital frames. Each frame may be displayed separately to form an image or in succession, e.g., 24 or 30 frames per second, to form a video (i.e., a set of images that may appear to be moving). Digital video 120 may comprise one or more scenes where a scene comprises a set of related frames. In one embodiment, digital video 120 comprises an RGB color space where each frame has a red plane with red pixel values, a blue plane with blue pixel values, and a green plane with green pixel values. The red, green, and blue pixel values are combined during the display of digital video 120 to reproduce the images of digital video 120. In other embodiments, each frame may comprise other sets of color planes or may combine the pixel values for each color.

Digital video 120 may be generated either from a video or other set of images from another medium, e.g., film, or from a camera or other image capture device directly. For example, a TechniColor film captured using a TechniColor camera may be converted into digital video 120 using a scanning process. In other embodiments, digital video 120 may comprise a single image frame or an unrelated set of image frames.

Figure 2:
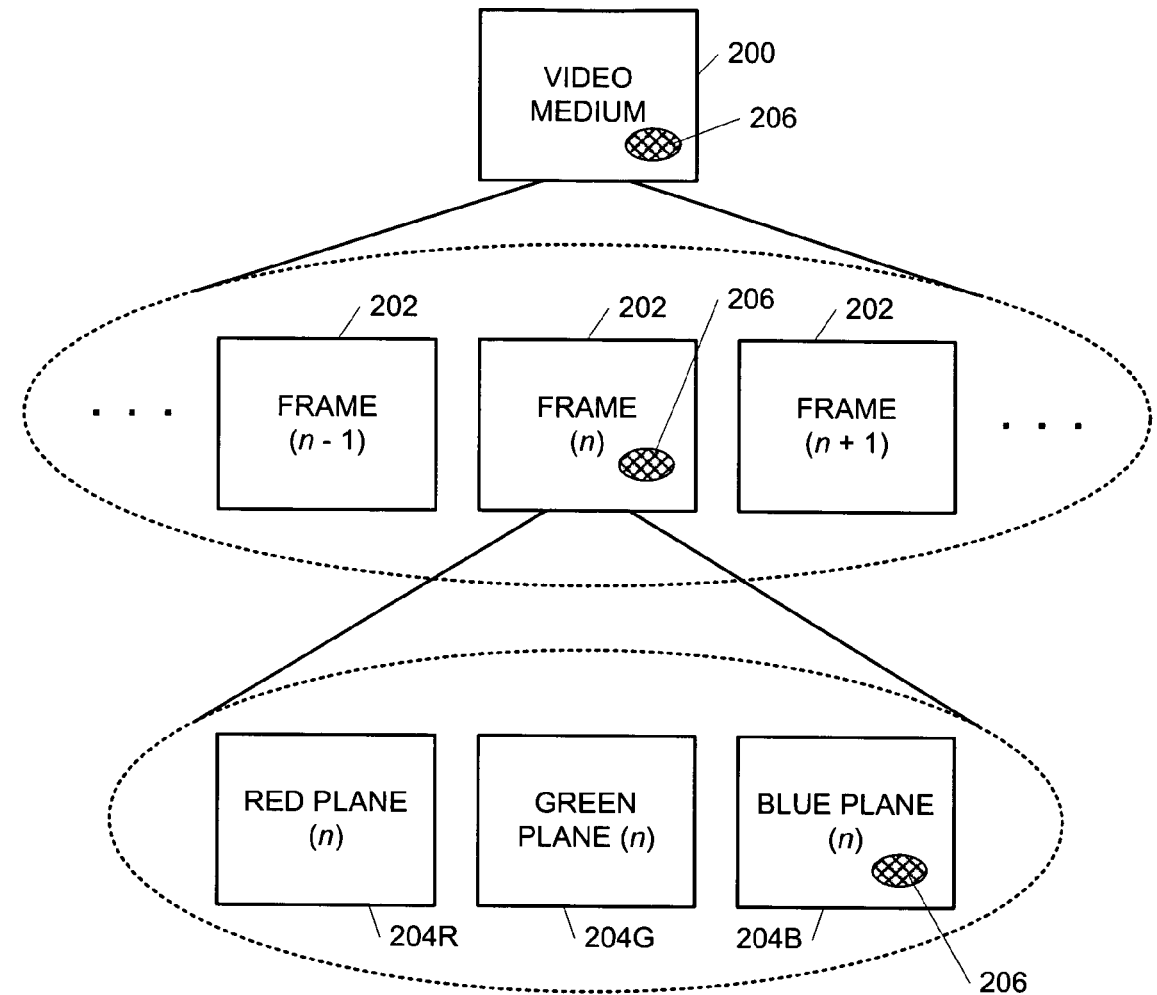
FIG. 2 is a block diagram illustrating a video medium with an artifact according to one embodiment of the present invention.

FIG. 2 is a block diagram illustrating a video medium 200 with an artifact 206 from which digital video 120 is generated. Video medium 200 comprises a sequential series of frames 202 where each frame has a red plane 204R, a green plane 204G, and a blue plane 204B, i.e., color planes 204. In one embodiment, video medium 200 comprises TechniColor film. In other embodiments, video medium 200 comprises other types of film or media.

In the example shown in FIG. 2, frame (n) 202 and blue plane (n) 204B comprises artifact 206 where n is an integer that designates a frame in the sequence. Artifact 206 may be any type of aberration in video medium 200, such as an aberration caused by dust or a scratch, which causes an undesired form, shape, or color to appear in the display of one or more images of video medium 200. Video medium 200 may comprise any number of artifacts 206 such that each frame 202 and each color plane 204 may have zero or more artifacts 206.

Figure 3:
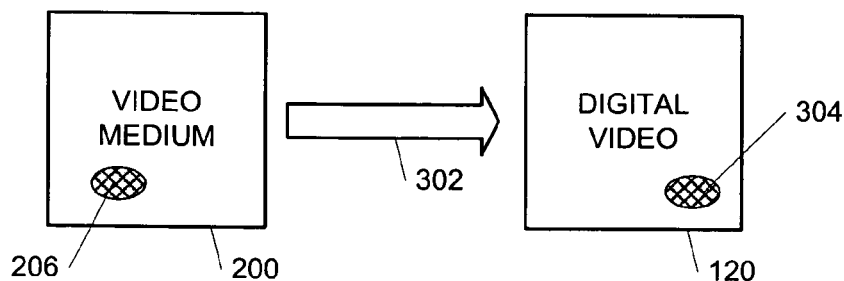
FIG. 3 is a block diagram illustrating a process of generating a digital video from a video medium with an artifact according to one embodiment of the present invention.

FIG. 3 is a block diagram illustrating a process of generating digital video 120 from video medium 200 as indicated by an arrow 302. In the process of converting video medium 200 to digital video 120, artifact 206 as well as any other artifacts (not shown) is reproduced in one or more of the frames or color planes of digital video 120 as artifact 304.

Referring back to FIG. 1, processing system 100 executes artifact reduction module 110, artifact detection module 112, and artifact removal module 114 to generate enhanced digital video 122 from digital video 120. In doing so, artifact reduction module 110, artifact detection module 112, and artifact removal module 114 attempt to remove artifact 304 and any other artifacts (not shown) from digital video 120 to generate enhanced digital video 122.

Figure 4:
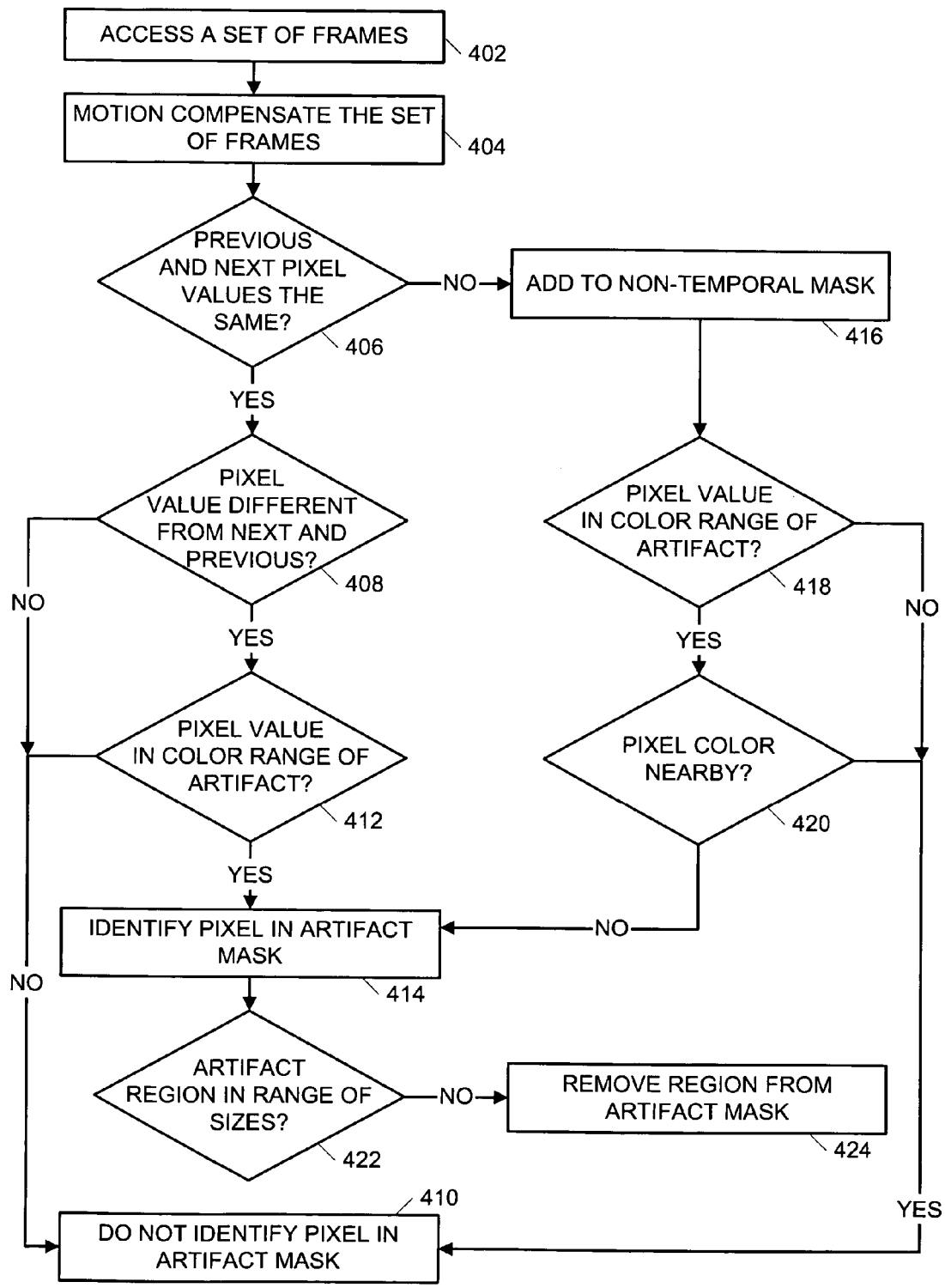
FIG. 4 is a flow chart illustrating a method for detecting artifacts from a digital video according to one embodiment of the present invention.

The operation of artifact detection module 112 will now be described with reference to FIG. 4. FIG. 4 is a flow chart illustrating a method for detecting artifacts from a digital video 120. The method may be performed by processing system 100 using artifact reduction module 110 and artifact detection module 112 for each frame of digital video 120.

Figure 5:
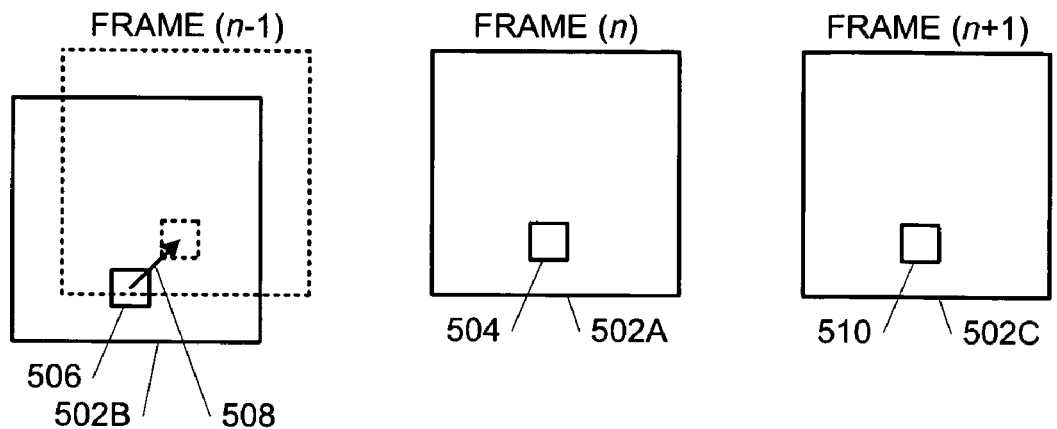
FIG. 5 is a block diagram illustrating a process for detecting artifacts from a digital video according to embodiments of the present invention.

In FIG. 4, processing system 100 executes artifact detection module 112 to access a set of frames as indicated in a block 402. As shown in FIG. 5, the set of frames comprises at least a current frame (n) 502A, a previous frame (n−1) 502B, and a next frame (n+1) 502C where n is an integer that designates a frame 502 in a sequential series of frames 502 of digital video 120. In one embodiment, each frame 502 comprises separate red, green, and blue color planes. In other embodiments, each frame 502 may comprise other separate or intermixed color planes.

Processing system 100 executes artifact detection module 112 to perform motion compensation on the set of frames, if necessary, as indicated in a block 404. More particularly, processing system 100 executes artifact detection module 112 to separately motion compensate previous frame 502B and next frame 502C with respect to frame 502A. Because the video capture device and/or one or more objects in the scene may move between frames, a motion difference may be computed by artifact detection module 112 to measure the estimate the amount of movement between the frames. If the motion difference between frames is relatively small, then artifact detection module 112 omits performing motion compensation. If the motion difference between frames is relatively large, then artifact detection module 112 uses an affine transformation to align the frames. If the motion difference between frames is relatively large after the affine transformation, then artifact detection module 112 applies a multi-zone registration scheme to align the frames. In other embodiments, the function of block 404 may be omitted altogether.

Three embodiments of determining whether the current pixel value in frame 502A is significantly different from the corresponding pixel values in previous frame 502B and next frame 502C will now be described. In these embodiments, the color pixel at location x,y of frame t is represented by $P_t=(r, g, b)_{(x,y,t)}$ where the location of x,y is omitted in the following description. The term $(v_t^0, v_t^1, v_t^2)$ represents the three colors $(r_t, g_t, b_t)$ of the pixel at location x,y of the frame t. The variable $DS_{x,y}$ is a binary variable where a value of one indicates a potential artifact pixel, i.e., a value of one indicates that the current pixel value in frame 502A is significantly different from the corresponding pixel values in previous frame 502B and next frame 502C.

In the first embodiment, for each pixel in frame 502A, a determination is made by processing system 100 as to whether corresponding pixel values in previous frame 502B and next frame 502C are approximately the same value as indicated in a block 406, by calculating the distance value $|v_{t+1}^c - v_{t-1}^c|$ for the color plane c and determining if $|v_{t+1}^c - v_{t-1}^c| < t_L$ where $t_L$ is a threshold. If the condition is met, then a determination is made by processing system 100 as to whether the current pixel value in frame 502A is significantly different from the corresponding pixel values in previous frame 502B and next frame 502C as indicated in a block 408 by checking the condition $|v_t^c - v_{t-1}^c| > t_H$ AND $|v_t^c - v_{t+1}^c| > t_H$, where $t_H$ is another threshold. The pixel is flagged as a candidate artifact pixel if the above conditions are met only in one color.

In the second embodiment, processing system 100 executes artifact detection module 112 to determine whether the current pixel value in frame 502A is significantly different from the corresponding pixel values in previous frame 502B and next frame 502C by calculating six distance values: $|r_t - r_{t-1}|$, $|g_t - g_{t-1}|$, $|b_t - b_{t-1}|$, $|r_t - r_{t+1}|$, $|g_t - g_{t+1}|$, and $|b_t - b_{t+1}|$. The pixel is flagged as a candidate artifact pixel if the following condition is met:

$$DS = \begin{cases} 1, & |v_t^{i1} - v_{t-1}^{i1}| > tH \text{ AND } |v_t^{i1} - v_{t+1}^{i1}| > tH \text{ AND} \\ & [(|v_t^{i2} - v_{t-1}^{i2}| < tL \text{ AND } |v_t^{i3} - v_{i-1}^{i3}| < tL) \text{ OR } (|v_t^{i2} - v_{t+1}^{i2}| < tL \text{ AND } |v_t^{i3} - v_{i+1}^{i3}| < tL)] \\ 0, & \text{otherwise} \end{cases}$$

where tH and tL are high and low thresholds, respectively.

For tL<tH, the above condition may be met by at most one color corresponding to the color plane of DS. As proof, if it is assumed that the condition is met for two colors with indexes i1 and i2, then $|v_t^{i1} - v_{t-1}^{i1}| > tH$ AND $|v_t^{i1} - v_{t+1}^{i1}| > tH$ and $|v_t^{i2} - v_{t-1}^{i2}| > tH$ AND $|v_t^{i2} - v_{t+1}^{i2}| > tH$.

This contradicts the other condition:

$[(|v_t^{i2} - v_{t-1}^{i2}| < tL$ AND $|v_t^{i3} - v_{t-1}^{i3}| < tL)$ OR $(|v_t^{i2} - v_{t-1}^{i2}| < tL$ AND $|v_t^{i3} - v_{i+1}^{i3}| < tL)]$.

In the third embodiment, processing system 100 executes artifact detection module 112 to determine whether the current pixel value in frame 502A is significantly different from the corresponding pixel values in previous frame 502B and next frame 502C by defining a distance measurement $D_z^{i1} = \sqrt{(v_t^{i2} - v_{t+z}^{i2})^2 + (v_t^{i3} - v_{t+z}^{i3})^2}$ and calculating six distances $D_{-1}^b = \sqrt{(r_t - r_{t-1})^2 + (g_t - g_{t-1})^2}$, $D_{-1}^g = \sqrt{(r_t - r_{t-1})^2 + (b_t - b_{t-1})^2}$, $D_{-1}^r = \sqrt{(g_t - g_{t-1})^2 + (b_t - b_{t-1})^2}$, $D_1^b = \sqrt{(r_t - r_{t+1})^2 + (g_t - g_{t+1})^2}$, $D_1^g = \sqrt{(r_t - r_{t+1})^2 + (b_t - b_{t+1})^2}$, and $D_1^r = \sqrt{(g_t - g_{t+1})^2 + (b_t - b_{t+1})^2}$. After finding the minimum distance $D_z^{i1}$ of the six distances, the pixel is flagged as a candidate artifact pixel if the following condition is met:

$$DS = \begin{cases} 1, & |v_t^{i1} - v_{t+z}^{i1}| > tH \text{ AND } [|v_t^{i2} - v_{t+z}^{i2}| < (k \cdot |v_t^{i1} - v_{t+z}^{i1}|)] \text{ AND} \\ & [|v_t^{i3} - v_{t+z}^{i3}| < (k \cdot |v_t^{i1} - v_{t+z}^{i1}|)] \\ 0, & \text{otherwise} \end{cases}$$

where tH is a fixed threshold and k is a real number in the range of (0,1]. Parameters tH and k control both the detection rate and the false alarms, i.e., pixels improperly identified as artifact pixels. A lower value of tH may result in a high detection rate and a high rate of false alarms. A higher value of k may result in a high detection rate and a high rate of false alarms.

The three embodiments may be in the increasing order of higher rates of artifact detection and false alarms. For example, the second embodiment just described may find more artifact pixels and more false alarms than the first embodiment described above.

Figure 6:
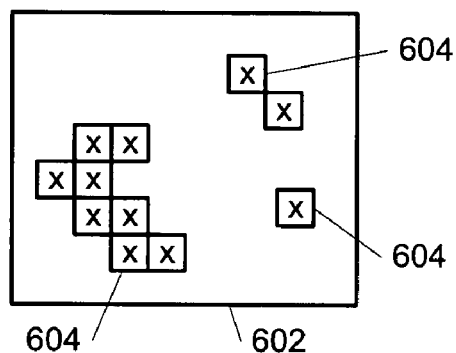
FIG. 6 is a block diagram illustrating an artifact mask according to one embodiment of the present invention.

If the current pixel is not flagged as a candidate, then the current pixel is not added to an artifact mask 602, shown in FIG. 6, as indicated in a block 410. Otherwise, a further determination is made by processing system 100 as to whether the current pixel value in frame 502A is in a color range of an artifact as indicated in a block 412. Artifacts such as dust and scratches typically cause pixel colors to be either abnormally bright or abnormally dark. Accordingly, processing system 100 executes artifact detection module 112 to determine whether the color of the current pixel is in the range of one or more known artifacts.

If the current pixel value in frame 502A is not in the color range of an artifact, then the current pixel is not added to artifact mask 602 as indicated in the block 410. If the current pixel value is not in the color range of an artifact, then the pixel value most likely does not comprise an artifact.

If the current pixel value in frame 502A is in the color range of an artifact, then processing system 100 executes artifact detection module 112 to identify the pixel in artifact mask 602 as indicated in the block 414. FIG. 6 is a block diagram illustrating artifact mask 602. Artifact mask 602 comprises a set of identifiers 604 where each identifier 604 is associated with a pixel in frame 502A that comprises a probable artifact. In the embodiment shown in FIG. 6, each identifier 604 corresponds spatially with the pixel that it identifies. In other embodiments, other types of identifiers may be used.

Figure 7:
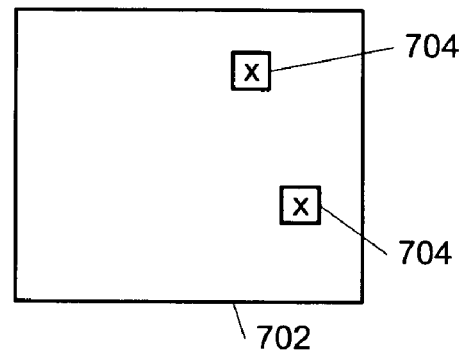
FIG. 7 is a block diagram illustrating a non-temporal mask according to one embodiment of the present invention.

If the corresponding pixel values in previous frame 502B and next frame 502C are not approximately the same as determined in block 406, then the current pixel is added to a non-temporal mask as indicated in a block 416. FIG. 7 is a block diagram illustrating a non-temporal mask 702. Non-temporal mask 702 comprises a set of identifiers 704 where each identifier 704 is associated with a pixel in frame 502A that is not temporally related to a corresponding pixel in either previous frame 502B or next frame 502C. In the embodiment shown in FIG. 7, each identifier 704 corresponds spatially with the pixel that it identifies. In other embodiments, other types of identifiers may be used.

A determination is made by processing system 100 as to whether the current pixel value in frame 502A is in a color range of an artifact as indicated in a block 418. If the current pixel value in frame 502A is not in the color range of an artifact, then the current pixel is not added to artifact mask 602 as indicated in the block 410.

If the current pixel value in frame 502A is in the color range of an artifact, then a determination is made by processing system 100 as to whether the color of the current pixel occurs nearby in frame 502A as indicated in a block 420. Processing system 100 executes artifact detection module 112 to search for color matches of the pixel. A color match with a nearby pixel in frame 502A indicates that the pixel is most likely a desired part of the image and is not an artifact. In one embodiment, processing system 100 executes artifact detection module 112 to search pixels adjacent to the current pixel in frame 502A in a spiraling order. In other embodiments, processing system 100 executes artifact detection module 112 to search nearby pixels in frame 502A in other ways.

If the color of the current pixel occurs nearby in frame 502A, then the current pixel is not added to artifact mask 602 as indicated in the block 410. If the color of the current pixel does not occur nearby in frame 502A, then processing system 100 executes artifact detection module 112 to identify the pixel in artifact mask 602 as indicated in the block 414.

Figure 8:
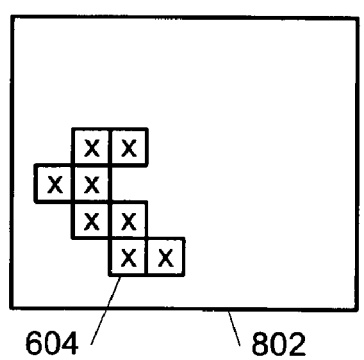
FIG. 8 is a block diagram illustrating an artifact mask with selected regions removed according to one embodiment of the present invention.

After the above functions are performed on each pixel of frame 502A, a determination is made by processing system 100 as to whether an artifact region is in a range of sizes of known artifacts as indicated in a block 422. An artifact region is a region that encompasses identifiers 604 in artifact mask 602. In one embodiment, processing system 100 executes artifact detection module 112 to perform a series of morphological dilations and erosions to generate a second artifact mask 802 as shown in FIG. 8.

If an artifact region is not in a range of sizes of known artifacts, then processing system 100 executes artifact detection module 112 to remove the region from artifact mask 602 as indicated in a block 424. In artifact mask 802, regions that are too small are eliminated as may be seen by comparing artifact mask 802 with artifact mask 602 in FIG. 6. As a result, artifact mask 802 comprises the remaining identifies 604. Regions in artifact mask 602 that are too large (not shown) are also eliminated.

If an artifact region is in a range of sizes of known artifacts, then the region remains in artifact mask 802.

Figure 9:
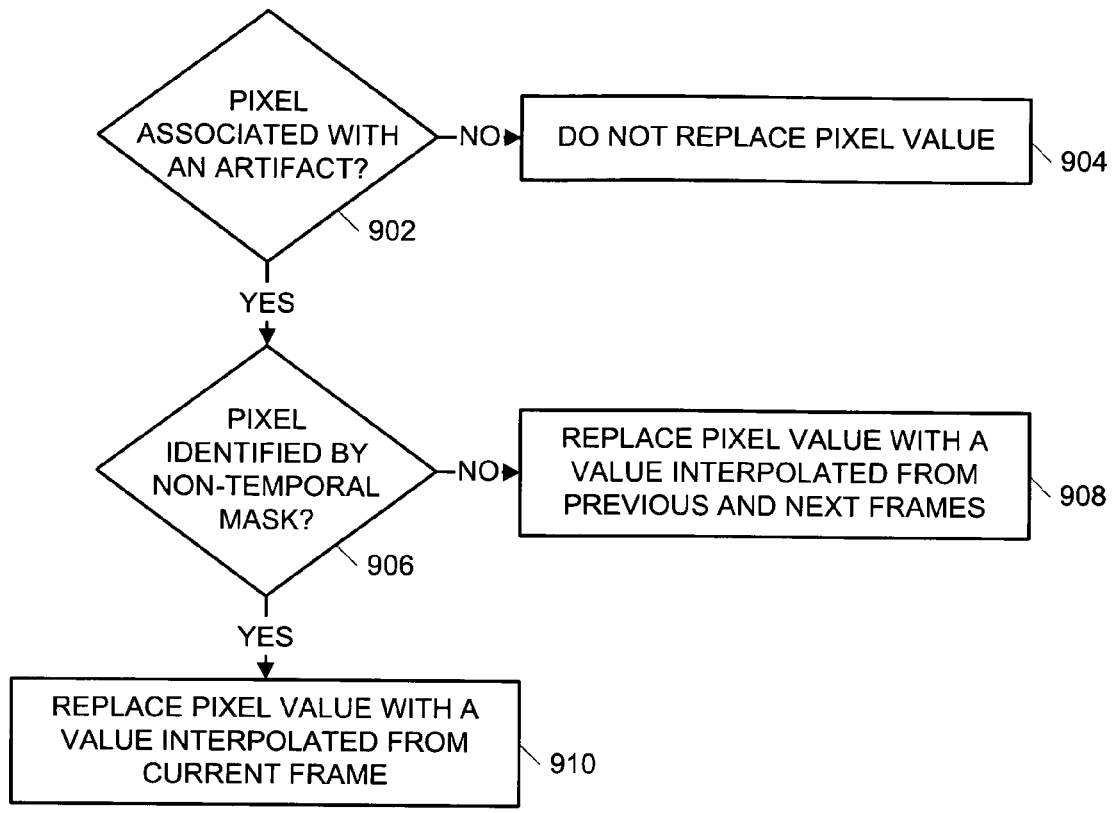
FIG. 9 is a flow chart illustrating a method for removing artifacts from a digital video according to one embodiment of the present invention.
Figure 10:
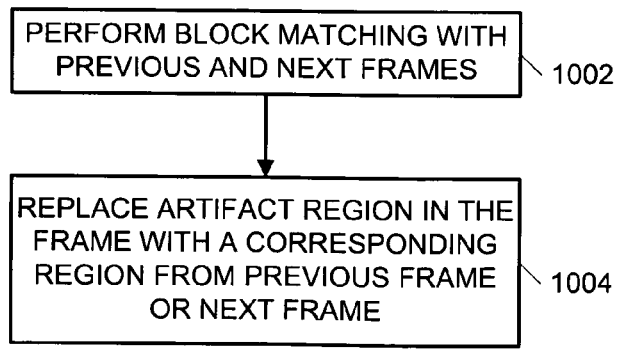
FIG. 10 is a flow chart illustrating a method for removing artifact regions from a digital video according to one embodiment of the present invention.

In one embodiment, after one or more artifacts are detected as just described, processing system 100 executes artifact removal module 114 to remove the artifacts using either the method shown in FIG. 9 or the method shown in FIG. 10.

FIG. 9 is a flow chart illustrating a method for removing artifacts from digital video 120. The method may be performed by processing system 100 using artifact removal module 114 for each pixel in each frame 502 of digital video 120.

For each pixel in frame 502A, a determination is made by processing system 100 as to whether a pixel is associated with an artifact using artifact removal module 114 as indicated in a block 902. Artifact removal module 114 makes the determination by examining a location in artifact mask 602 associated with the pixel. The location indicates that the pixel is associated with an artifact if artifact mask 802 comprises an identifier 604 associated with the pixel, i.e., the identifier 604 associated with the pixel is part of an artifact region. If the pixel is not associated with an artifact, then artifact removal module 114 does not replace the pixel value associated with the pixel as indicated in a block 904.

If the pixel is associated with an artifact, then a determination is made by artifact removal module 114 as to whether the pixel is identified by non-temporal mask 702 as indicated in a block 906. If the pixel is not identified by non-temporal mask 702, then artifact removal module 114 replaces the pixel value of the pixel with a value interpolated from previous frame 502B and next frame 502C as indicated in a block 908. In one embodiment, artifact removal module 114 calculates the interpolated value by solving a linear regression for pixel values from previous frame 502B and next frame 502C that correspond to the artifact pixel and applying the estimate from the linear regression to calculate the interpolated value. In another embodiment, artifact removal module 114 calculates the interpolated value by averaging pixel values in previous frame 502B and next frame 502C that correspond to the pixel in frame 502A. In other embodiments, artifact removal module 114 calculates the interpolated value in other ways and may use corresponding pixels from frames prior to previous frame 502B (not shown) and/or subsequent to next frame 502C (not shown) in the calculation.

If the pixel is identified by non-temporal mask 702, then artifact removal module 114 replaces the pixel value of the pixel with a value interpolated from pixel values in frame 502A as indicated in a block 910. In one embodiment, artifact removal module 114 calculates the interpolated value by solving a linear regression for pixel values from other color planes that correspond to the artifact pixel and applying the estimate from the linear regression to calculate the interpolated value. In other embodiments, artifact removal module 114 calculates the interpolated value in other ways.

FIG. 10 is a flow chart illustrating a method for removing artifact regions from digital video 120. The method may be performed by processing system 100 using artifact reduction module 110 and artifact removal module 114 for each frame 502 of digital video 120 with one or more artifact regions.

In FIG. 10, processing system 100 executes artifact removal module 114 to perform block matching with a previous frame 502B and a next frame 502C as indicated in a block 1002. Artifact removal module 114 uses artifact mask 802 to identify artifact regions. Artifact removal module 114 searches previous frame 502B and next frame 502C using motion compensation techniques, if necessary, to find the closest match in previous frame 502B and next frame 502C, respectively, with frame (n) 502A excluding any artifact regions.

Figure 11:
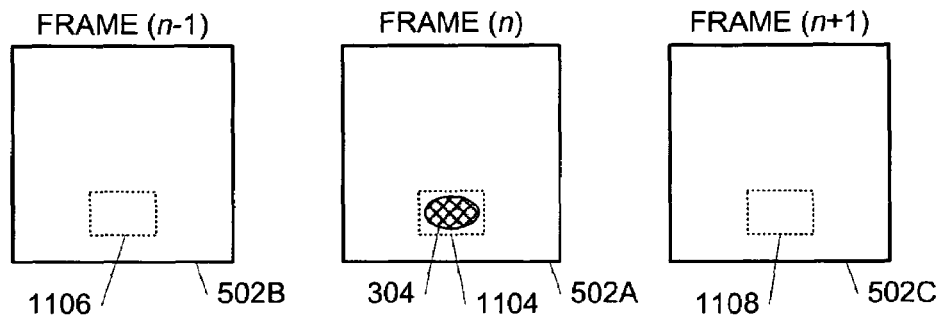
FIG. 11 is a block diagram illustrating a process for replacing a region with an artifact in a frame of a digital video according to one embodiment of the present invention.

Processing system 100 executes artifact removal module 114 to replace each artifact region in frame 502A with a corresponding region from either previous frame 502B or next frame 502C as indicated in a block 1004. FIG. 11 is a block diagram illustrating a process for replacing an artifact region 1102 that includes artifact 304 in frame 502A of digital video 120. If previous frame 502B is the closest match with frame 502A, then artifact removal module 114 replaces artifact region 602 in frame 502A with a region 1104 from previous frame 502B. If next frame 502C is the closest match with frame 502A, then artifact removal module 114 replaces artifact region 602 in frame 502A with a region 1106 from next frame 502C. Other artifact regions (not shown) are similarly replaced.

Using the system and method described above, artifacts in a digital video, such as those that appear in a video medium from which the digital video is derived, may be removed. Accordingly, the display of the digital video may be enhanced.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a processing system, the method comprising:
    detecting a first set of pixel values in a first region of a current frame of a digital video that differs from at least one of a corresponding second set of pixel values in a previous frame and a corresponding third set of pixel values in a next frame;
    determining whether the first region is in a range of sizes of known artifacts; and
    replacing the first set of pixel values in the first frame with a set of replacement values in response to determining that the first region is in the range of sizes of known artifacts.

2. The method of claim 1 further comprising:
detecting that the first set of pixel values are in a range of colors of the known artifacts.

3. The method of claim 1 further comprising:
interpolating the set of replacement values using at least the corresponding second set of pixel values in the previous frame and the corresponding third set of pixel values in the next frame.

4. The method of claim 1 further comprising:
comparing the corresponding second set of pixel values in the previous frame with the corresponding third set of pixel values in the next frame.

5. The method of claim 4 further comprising:
identifying a set of pixels corresponding to the first set of pixel values in a non-temporal mask in response to the corresponding second set of pixel values in the previous frame differing from the corresponding third set of pixel values in the next frame.

6. The method of claim 5 further comprising:
interpolating the set of replacement values using a fourth set of pixel values in the current frame in response to the corresponding second set of pixel values in the previous frame differing from the corresponding third set of pixel values in the next frame.

7. The method of claim 6 wherein the first set of pixel values are from a first color plane of the digital video, and wherein the fourth set of pixel values are from at least a second color plane of the digital video that differs from the first color plane.

8. The method of claim 4 further comprising:
comparing the first set of pixel values with a fourth set of pixel values in the current frame in response to the corresponding second set of pixel values in the previous frame differing from the corresponding third set of pixel values.

9. The method of claim 1 further comprising:
performing block matching between the first region in the current frame and a second region from the previous frame; and
replacing the first region with the second region from the previous frame, wherein the second region comprises the set of replacement values.

10. The method of claim 1 further comprising:
performing block matching between the first region in the current frame and a second region from the next frame; and
replacing the first region with the second region from the next frame, wherein the second region comprises the set of replacement values.

11. The method of claim 1 further comprising:
performing motion compensation on the previous frame with respect to the current frame prior to detecting the first set of pixel values in the first region in the current frame.

12. The method of claim 1 further comprising:
performing motion compensation on the next frame with respect to the current frame prior to detecting the first set of pixel values in the first region in the current frame.

13. A system comprising:
a processor; and
a memory system for storing a digital video and an artifact reduction module;
wherein the processor is configured to execute the artifact reduction module to:
detect a first set of pixel values in a first region of a current frame of the digital video that differs from at least one of a corresponding second set of pixel values in a previous frame and a corresponding third set of pixel values in a next frame;
determine whether the first region is in a range of sizes of known artifacts; and
replace the first set of pixel values in the first frame with a set of replacement values.

14. The system of claim 13 wherein the memory system comprises an artifact detection module, wherein the processor is configured to execute the artifact detection module to:
detect that the first set of pixel values in the current frame differs significantly from the corresponding second set of pixel values in previous frame and the corresponding third set of pixel values in the next frame.

15. The system of claim 14 wherein the memory system comprises an artifact removal module, wherein the processor is configured to execute the artifact removal module to:
calculate the set of replacement values from the corresponding second set of pixel values and the corresponding third set of pixel values.

16. The system of claim 14 wherein the processor is configured to execute the artifact detection module to:
perform motion compensation on the previous frame with respect to the current frame to align a first set of pixels associated with the first set of pixel values with a second set of pixels associated with the corresponding second set of pixel values.

17. The system of claim 16 wherein the processor is configured to execute the artifact detection module to:
perform motion compensation on the next frame with respect to the current frame to align a first set of pixels associated with the first set of pixel values with a third set of pixels associated with the corresponding third set of pixel values.

18. The system of claim 13 wherein the processor is configured to execute the artifact reduction module to:
identify a set of pixels associated with the first set of pixel values in an artifact mask.

19. The system of claim 13 wherein the processor is configured to execute the artifact reduction module to:
identify a set of pixels corresponding to the first set of pixel values in a non-temporal mask in response to the corresponding second set of pixel values in the previous frame differing from the corresponding third set of pixel values in the next frame.

20. The system of claim 13 wherein the processor is configured to execute the artifact reduction module to:
interpolate the set of replacement values using a fourth set of pixel values in the current frame in response to the corresponding second set of pixel values in the previous frame differing from the corresponding third set of pixel values in the next frame.

21. The system of claim 13 wherein the processor is configured to execute the artifact reduction module to:
compare the first set of pixel values with colors a fourth set of pixel values in the current frame in response to the corresponding second set of pixel values in the previous frame differing from the corresponding third set of pixel values in the next frame.

22. The system of claim 13 wherein the processor is configured to execute the artifact reduction module to:
perform block matching between the first region in the current frame and a second region from the previous frame; and
replace the first region that comprises the first pixel value with the second region from the previous frame, wherein the second region comprises the set of replacement values.

23. The system of claim 13 wherein the processor is configured to execute the artifact detection module to:
- compare the corresponding second set of pixel values in the previous frame with the corresponding third set of pixel values in the next frame;
- identify a set of pixels corresponding to the first set of pixel values in a non-temporal mask in response to the corresponding second set of pixel values in the previous frame differing from the corresponding third set of pixel values in the next frame; and
- interpolate the set of replacement values using a fourth set of pixel values in the current frame in response to the corresponding second set of pixel values in the previous frame differing from the corresponding third set of pixel values in the next frame;
- wherein the first set of pixel values are from a first color plane of the digital video, and wherein the fourth set of pixel values are from at least a second color plane of the digital video that differs from the first color plane.

24. A system comprising:
- means for detecting a first set of pixel values in a first region of a current frame of a digital video that differs from at least one of a corresponding second set of pixel values in a previous frame and a corresponding third set of pixel values in a next frame;
- means for determining whether the first region is in a range of sizes of known artifacts; and;
- means for replacing the first set of pixel values in the first frame with a set of replacement values in response to determining that the first region is in the range of sizes of known artifacts.

25. The system of claim 24 further comprising:
- means for performing motion compensation on the previous frame and the next frame with respect to the current frame.

26. The system of claim 24 further comprising:
- means for comparing the corresponding second set of pixel values in the previous frame with the corresponding third set of pixel values in the next frame;
- means for identifying a set of pixels corresponding to the first set of pixel values in a non-temporal mask in response to the corresponding second set of pixel values in the previous frame differing from the corresponding third set of pixel values in the next frame; and
- means for interpolating the set of replacement values using a fourth set of pixel values in the current frame in response to the corresponding second set of pixel values in the previous frame differing from the corresponding third set of pixel values in the next frame;
- wherein the first set of pixel values are from a first color plane of the digital video, and wherein the fourth set of pixel values are from at least a second color plane of the digital video that differs from the first color plane.

27. A program product comprising a computer-readable medium including instructions executable by a processing system for:
- detecting a first set of pixel values in a first region of a current frame of a digital video that differs from at least one of a corresponding second set of pixel values in a previous frame and a corresponding third set of pixel values in a next frame;
- determining whether the first region is in a range of sizes of known artifacts; and
- replacing the first set of pixel values in the first frame with a set of replacement values in response to determining that the first region is in the range of sizes of known artifacts.

28. The program product of claim 27 wherein the computer-readable medium includes instructions executable by the processing system for:
- detecting that the first set of pixel values are in a range of colors of the known artifacts.

29. The program product of claim 27 wherein the computer-readable medium includes instructions executable by the processing system for:
- interpolating the set of replacement values using at least the corresponding second set of pixel values in the previous frame and the corresponding third set of pixel values in the next frame.

30. The program product of claim 27 wherein the computer-readable medium includes instructions executable by the processing system for:
- in a set of pixels corresponding to the first set of pixel values in a non-temporal mask in response to the corresponding second set of pixel values in the previous frame differing from the corresponding third set of pixel values in the next frame.

31. The program product of claim 27 wherein the computer-readable medium includes instructions executable by the processing system for:
- interpolating the set of replacement values using a fourth set of pixel values in the current frame in response to the corresponding second set of pixel values in the previous frame differing from the third set of pixel values in the next frame.

32. The program product of claim 27 wherein the computer-readable medium includes instructions executable by the processing system for:
- comparing the first set of pixel values with fourth set of pixel values in the current frame in response to the corresponding second set of pixel values in the previous frame differing from the corresponding third set of pixel values.

33. The program product of claim 27 wherein the computer-readable medium includes instructions executable by the processing system for:
- performing block matching between the first region in the current frame, a second region in the previous frame, and a third region in the next frame; and
- replacing the first region with either the second region from the previous frame that includes the set of replacement values or the third region from the next frame that includes the set of replacement values.

34. The program product of claim 27 wherein the computer-readable medium includes instructions executable by the processing system for:
- performing motion compensation on the previous frame and the next frame with respect to the current frame prior to detecting the first set of pixel values in the first region in the current frame.

35. A system comprising:
- an artifact detection module configured to detect a first set of pixel values in a first region of a current frame of a digital video that differs from at least one of a corresponding second set of pixel values in a previous frame and a corresponding third set of pixel values in a next frame and configured to determine whether the first region is in a range of sizes of known artifacts; and
- an artifact removal module configured to replace the first set of pixel values in the first frame with a set of replacement values.

* * * * *

UNITED STATES PATENT AND TRADEMARK OFFICE
CERTIFICATE OF CORRECTION

PATENT NO. : 7,643,088 B2  Page 1 of 1
APPLICATION NO. : 11/000766
DATED : January 5, 2010
INVENTOR(S) : D. Amnon Silverstein et al.

It is certified that error appears in the above-identified patent and that said Letters Patent is hereby corrected as shown below:

In column 10, line 6, in Claim 13, delete "values." and insert -- values in response to determining that the first region is in the range of sizes of known artifacts. --, therefor.

In column 10, line 54, in Claim 21, after "with" delete "colors".

In column 11, line 27, in Claim 24, delete "and;" and insert -- and --, therefor.

In column 11, line 55, in Claim 27, before "medium" insert -- storage --.

In column 12, line 2, in Claim 28, before "medium" insert -- storage --.

In column 12, line 7, in Claim 29, before "medium" insert -- storage --.

In column 12, line 14, in Claim 30, before "medium" insert -- storage --.

In column 12, line 16, in Claim 30, delete "in" and insert -- identifying --, therefor.

In column 12, line 22, in Claim 31, before "medium" insert -- storage --.

In column 12, line 30, in Claim 32, before "medium" insert -- storage --.

In column 12, line 33, in Claim 32, after "with" insert -- a --.

In column 12, line 39, in Claim 33, before "medium" insert -- storage --.

In column 12, line 49, in Claim 34, before "medium" insert -- storage --.

In column 12, line 65, in Claim 35, delete "values." and insert -- values in response to determining that the first region is in the range of sizes of known artifacts. --, therefor, Signed and Sealed this Twenty-second Day of June, 2010

David J. Kappos
*Director of the United States Patent and Trademark Office*